US009872275B2

(12) United States Patent
Kalhan et al.

(10) Patent No.: US 9,872,275 B2
(45) Date of Patent: Jan. 16, 2018

(54) INTER-CELL MESSAGING USING MBSFN SUBFRAME

(71) Applicant: Kyocera Corporation, Kyoto (JP)

(72) Inventors: Amit Kalhan, San Diego, CA (US);
Henry Chang, San Diego, CA (US);
Douglas Dunn, San Diego, CA (US);
David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 308 days.

(21) Appl. No.: 14/358,336

(22) PCT Filed: Nov. 12, 2012

(86) PCT No.: PCT/US2012/064707
§ 371 (c)(1),
(2) Date: May 15, 2014

(87) PCT Pub. No.: WO2013/074460
PCT Pub. Date: May 23, 2013

(65) Prior Publication Data
US 2014/0348052 A1    Nov. 27, 2014

Related U.S. Application Data

(60) Provisional application No. 61/559,870, filed on Nov. 15, 2011.

(51) Int. Cl.
*H04W 4/00*        (2009.01)
*H04B 7/216*       (2006.01)
(Continued)

(52) U.S. Cl.
CPC ......... *H04W 72/005* (2013.01); *H04L 12/189* (2013.01); *H04W 72/042* (2013.01); *H04W 72/0446* (2013.01)

(58) Field of Classification Search
CPC ........................... H04L 5/0057; H04L 5/0023
See application file for complete search history.

(56) References Cited

U.S. PATENT DOCUMENTS

| 6,711,408 B1 | 3/2004 | Raith |
| 2008/0225796 A1 | 9/2008 | Malladi et al. |

(Continued)

FOREIGN PATENT DOCUMENTS

| EP | 1 819 186 | 8/2007 |
| EP | 2 302 969 | 3/2011 |

(Continued)

OTHER PUBLICATIONS

"Guidelines for using cdma2000 1x Revision E Features on Earlier Revisions"; 3rd Generation Partnership Project 2, TSG-C; 3GPP2 C.S0099-0; Version 2.0; Jul. 2011.

(Continued)

*Primary Examiner* — Melanie Jagannathan (57) ABSTRACT

A cellular communication system and method for delivering information, e.g., data and/or control-signaling, to a user equipment (UE) from a neighboring node are disclosed. The cellular communication system includes a first node configured to transmit information in one or more Multicast Broadcast Single Frequency Network (MBSFN) subframes over a radio frequency (RF) (ink between the first node and the UE, while the UE is being served by a second node. The first node can use a network-defined, dedicated portion of the MBSFN subframe for this purpose. Instead of only allowing the second node to send data/signaling messages to the UE, the disclosed techniques allow neighboring nodes to also deliver information to the UE. In particular, the neighboring nodes can transmit data and/or control-signaling to the UE using MBSFN subframes in order to minimize signaling overhead and signaling delay.

6 Claims, 6 Drawing Sheets

(51) Int. Cl.
*H04W 72/00* (2009.01)
*H04L 12/18* (2006.01)
*H04W 72/04* (2009.01)

(56) References Cited

U.S. PATENT DOCUMENTS

| | | | |
|---|---|---|---|
| 2008/0268833 | A1 | 10/2008 | Huang et al. |
| 2008/0318578 | A1 | 12/2008 | Worrall |
| 2009/0129341 | A1 | 5/2009 | Balasubramanian et al. |
| 2009/0156225 | A1 | 6/2009 | Angelow et al. |
| 2009/0201881 | A1 | 8/2009 | Chun et al. |
| 2009/0252077 | A1 | 10/2009 | Khandekar et al. |
| 2009/0312008 | A1 | 12/2009 | Lindoff et al. |
| 2010/0008282 | A1 | 1/2010 | Bhattad et al. |
| 2010/0272004 | A1 | 10/2010 | Maeda et al. |
| 2010/0315963 | A1 | 12/2010 | Jading et al. |
| 2011/0190011 | A1 | 8/2011 | Choi et al. |
| 2011/0256833 | A1* | 10/2011 | Racz ............... H04W 24/08 455/63.1 |
| 2011/0294508 | A1 | 12/2011 | Min et al. |
| 2011/0299449 | A1* | 12/2011 | Kwon ............... H04L 5/0023 370/312 |
| 2012/0021753 | A1* | 1/2012 | Damnjanovic ..... H04W 72/082 455/450 |
| 2013/0028161 | A1 | 1/2013 | Maeda et al. |
| 2013/0040691 | A1 | 2/2013 | Ode et al. |
| 2013/0310077 | A1* | 11/2013 | Siomina ............... H04W 4/02 455/456.2 |
| 2014/0293858 | A1* | 10/2014 | Kalhan ............ H04W 36/0072 370/311 |

FOREIGN PATENT DOCUMENTS

| | | |
|---|---|---|
| WO | WO 2008/118064 | 10/2008 |
| WO | WO 2008/134554 | 11/2008 |
| WO | WO 2008/135933 | 11/2008 |
| WO | WO 2008/157717 | 12/2008 |
| WO | WO 2009/113918 | 9/2009 |
| WO | WO 2011/135693 | 11/2011 |
| WO | WO 2011/135825 | 11/2011 |
| WO | WO 2013/074457 | 5/2013 |
| WO | WO 2013/074458 | 5/2013 |
| WO | WO 2013/074461 | 5/2013 |

OTHER PUBLICATIONS

"Femtocell activities in 3GPP2 TSG-C"; Tiedemann, Edward G; Mar. 31, 2009; New Orleans, LA; XP002606265.

"Service Information Exchange for MBMS Service Continuity"; Alcatel Lucent et al.; 3GPP TSP-RAN WG3 Meeting #74; San Francisco, CA; Nov. 2011.

* cited by examiner

INTER-CELL MESSAGING USING MBSFN SUBFRAME

CLAIM OF PRIORITY

The present application claims priority to Provisional Application No. 61/559,870 entitled "Unicast Data/Control-Signaling in MBSFN Subframe," filed Nov. 15, 2011, and assigned to the assignee hereof and hereby expressly incorporated by reference.

REFERENCE TO CO-PENDING APPLICATIONS FOR PATENT

The present application relates to PCT Application No. PCT/US2012/064704, entitled "Node Detection in a Cellular Communication Network," filed concurrently with this application, and assigned to the assignee hereof and expressly incorporated by reference herein; to PCT Application No. PCT/US2012/064700, entitled "Handover Management Using a Broadcast Channel in a Network Having Synchronized Base Stations," filed concurrently with this application; and to PCT Application No. PCT/US2012/064708, entitled "Handover Signaling Using an MBSFN in a Cellular Communication System," filed concurrently with this application, and assigned to the assignee hereof and expressly incorporated by reference herein.

TECHNICAL FIELD

The present disclosure generally relates to wireless communications, and more particularly, to cellular networks that include multicast/broadcast single frequency networks.

BACKGROUND

Multimedia Broadcast Multicast Service (MBMS) is a Point-to-Multipoint (PTM) interface specification designed to provide efficient delivery of broadcast and multicast services within 3GPP cellular networks. Examples of MBMS interface specifications include those described in Universal Mobile Telecommunications System (UMTS) and Long-Term Evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside an MBSFN (Multicast Broadcast Single Frequency Network) area normally transmit the same MBMS service and data.

SUMMARY

Disclosed herein are techniques for delivering data and/or control-signaling, to user equipment (UE) from a neighboring node using one or more Multicast Broadcast Single Frequency Network (MBSFN) subframes. According to an aspect of these techniques, a cellular communication system is capable of delivering information, e.g., data and/or control-signaling, to an UE from a neighboring, non-serving node. The cellular communication system includes a non-serving node configured to transmit information in one or more MBSFN subframes over a radio frequency (RF) link between the non-serving node and the UE, while the UE is being served by a second node. The non-serving node can use a network-defined, dedicated portion of the MBSFN subframes for this purpose. Instead of allowing only the serving node to send data/signaling messages to the UE, the disclosed techniques allow non-serving nodes to also deliver information to the UE. In particular, the non-serving nodes can transmit data and/or control-signaling to the UE using MBSFN subframe(s) in order to minimize signaling overhead and signaling delay.

Other aspects, features, advantages of the foregoing techniques will be or will become apparent to one with skill in the art upon examination of the following figures and detailed description. It is intended that all such additional aspects, features, and advantages be included within this description and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, where appropriate to avoid obscuring the invention, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Figure 1:
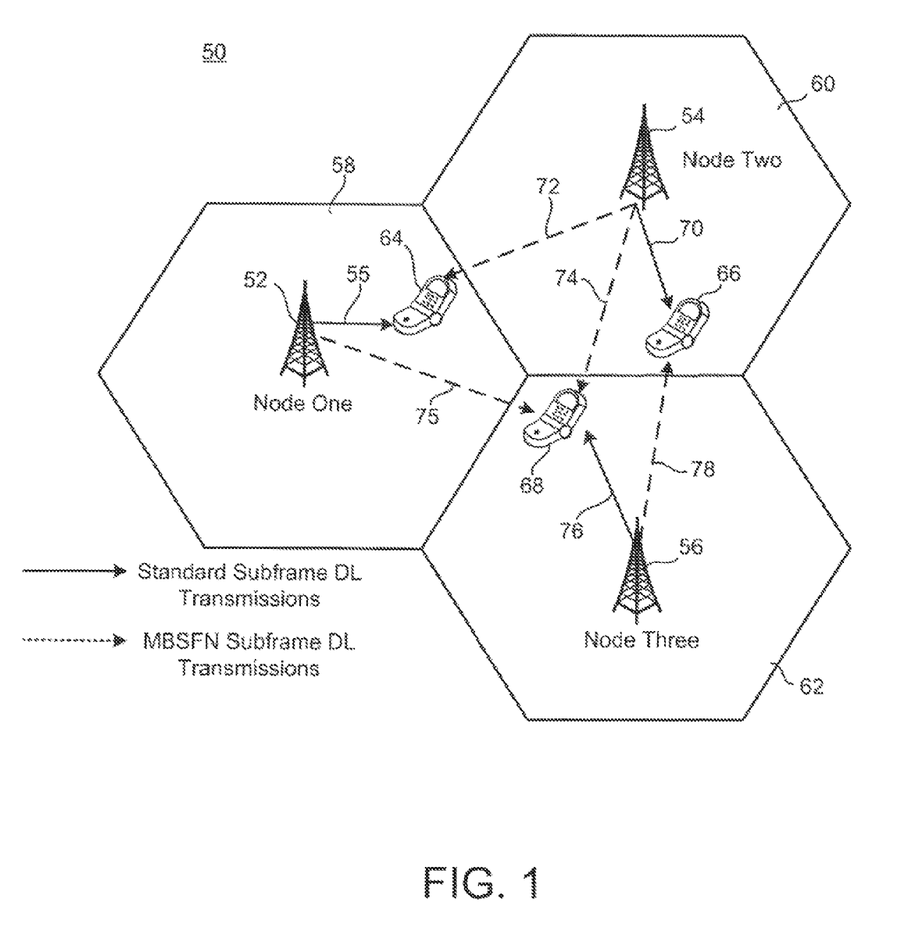
FIG. 1 illustrates an exemplary cellular communication network including plural nodes.

FIG. 1 illustrates an exemplary cellular communication network 50 including plural nodes 52, 54, 56 and UEs 64, 66, 68. The terms "system" and "network" are used interchangeably in this disclosure. Node one 52 provides services in a first coverage area 58. As shown, a first UE 64 receives services from node one 52, including MBSFN subframe downlink (DL) transmissions 55. The first UE 64 may also receive MBSFN subframe transmissions 72 from node two 54. Node two 54 provides services in a second coverage area 60. As shown, a second UE 66 receives services from node two 54, including MBSFN subframe DL transmissions 70. The second UE 66 may also receive MBSFN subframe transmissions 78 from node three 56. Node three 56 provides services in a third coverage area 62. As shown, a third UE 68 receives services from node three 56, including MBSFN subframe DL transmissions 76. The third UE 68 may also receive MBSFN subframe transmissions 74, 75 from node one 52 and node two 54, respectively.

The nodes 52, 54, 56 may communicate with each other over a backhaul network (not shown). Although only three UEs 64, 66, 68 and three nodes 52, 54, 56 are shown, the network 50 may include any suitable number of UEs and nodes.

The network 50 is an LTE network and nodes 52, 54, 56 may be evolved Node Bs (eNBs). The network 50 can include other network entities as well, for example, one or more network control entities. The Third-Generation Partnership Project Long-Term Evolution (3GPP LTE) communication specification is a specification for systems where base stations (eNBs) provide service to mobile wireless communication devices (UEs) using orthogonal frequency-division multiplexing (OFDM) on the downlink and single-carrier frequency-division multiple access (SC-FDMA) on the uplink. Although the techniques described herein may be applied in other types of communication systems, the exemplary network discussed herein operates in accordance with a 3GPP LTE communication specification.

Nodes one, two and three 52, 54, 56 can be synchronized to the cellular network 50 to transmit MBSFN subframes on the same frequency at the same time.

In other words, they can be in the same MBSFN. Based on the techniques described herein, including those methods described in reference to FIGS. 6-8, a neighboring node can unicast/multicast node-specific and/or UE-specific information in MBSFN subframe data regions to a UE located in another cell or its own cell. The other cell may be an E-UTRAN cell, for example.

An eNB communicates with the UEs in the network and may also be referred to as a base station, a Node B, an access point or the like. Each eNB 52, 54, 56 may provide communication coverage for a particular geographic area. To improve network capacity, the overall coverage area of an eNB may be partitioned into multiple smaller areas. In 3GPP, the term "cell" can refer to the coverage area of an eNB and/or an eNB subsystem serving a smaller partition.

An eNB may provide communication coverage for a macro cell, a pico cell, a femto cell, and/or other types of cells. As depicted in FIG. 1, the nodes 52, 54, 56 are each a macro node that covers a macro cell that may span a relatively large geographic area (e.g., several kilometers in radius) and may allow network access to UEs with service subscriptions. However, the nodes 52, 54, 56 may be other types of nodes, such as pico, femto nodes or a combination of various node types. A pico cell may cover a smaller geographic area than a macro cell. A home node, also referred to as a femto node, may cover a femto cell, which is a relatively small geographic area (e.g., about the size of a residence) and may allow access by UEs having association with the femto cell, e.g., user UEs in a home, user UEs subscribing to a special service plan, or the like.

A home eNB facilitates wireless communication over a licensed cellular radio band, as opposed to an unlicensed band, utilized by wireless local area network (WLAN) routers. A home eNB may be installed in a user's home and provide indoor wireless coverage to UE using existing broadband Internet connections. Such personal miniature base stations are also known as access point (AP) base stations. Typically, such miniature base stations are connected to the Internet and the mobile operator's network via Internet protocol (IP) communication over a DSL router or cable modem.

Each of the UEs 64, 66, 68 may also be referred to as a terminal, mobile station, mobile device, subscriber unit, station, wireless communication device, or the like. Each of the UEs 64, 66, 68 may be a cellular phone, smart phone, a personal digital assistant (PDA), a wireless modem, a laptop computer, a cordless phone, or the like. The UEs 64, 66, 68 can include one or more additional RF transceivers so that they can communicate with nodes that use different radio access technologies (RATs). For example, in addition to the cellular WWAN interface, the UE can include a WLAN interface, such as an IEEE 802.11 Wi-Fi air interface.

The UEs 64, 66, 68 communicate with the nodes 52, 54, 56 via downlinks (DL) and uplinks (UL). The downlink (or forward link) refers to the communication link from the node to the UE, and the uplink (or reverse link) refers to the communication link from the UE to the node. In FIG. 1, the solid lines 55, 70, 76 indicate transmissions between the UEs 64, 66, 68 and their respective serving node 52, 54, 56. A serving node is a node designated to serve a UE on the downlink and/or uplink. The dashed lines 72, 74, 75, 78 indicate transmissions between the UEs 64, 66, 68 and non-serving nodes.

When a UE is close to the edge of its serving node's coverage area, an adjacent neighboring node can transmit node-specific information or UE-specific information in one or more MBSFN subframes to notify the nearby UE of its proximity to the neighboring node. To accomplish this notification, the neighboring node can transmit node-specific (cell-specific) information about itself, such as its carrier-frequency, cell-ID, transmit power, and the like, in the data regions of the MBSFN subframes. The cell-specific data can be included in the MBSFN subframe(s) so as not to interfere with MBSFN transmissions from other nodes by using the techniques described below, including those described in reference to FIGS. 7 and 8. UE-specific information includes information corresponding to and/or selected for delivery to one or more particular UEs, and may include signaling information and/or node-specific information.

Illustrating this operation in FIG. 1, node one 52 is shown transmitting one or more MBSFN subframes 75 to the third UE 68 in the third coverage area 62. Node two 54 is shown transmitting one or more MBSFN subframes 72 to the first UE 64 in the first coverage area 58. Node two 54 also transmits one or more MBSFN subframes 74 to the third UE 68 in the third coverage area 62. Node three 56 transmits one or more MBSFN subframes 78 to the second UE 66 in the second coverage area 60. These MBSFN subframes 72, 74, 75, 78 transmitted to non-served UEs can include node-specific information.

Although FIG. 1 describes a specific network configuration, the techniques disclosed herein are not limited to the specific example and can readily be applied to other networks. For example, the network 50 may take other forms, such as a heterogeneous network that includes nodes of different types, e.g., macro eNBs, pico eNBs, femto eNBs, WLAN APs, and/or the like. These different types of nodes may have different transmit power levels, different coverage areas. The network 50 may also include different numbers of elements, e.g., more or fewer nodes and/or UEs, than those shown in the figures, and may use different radio access technologies than those described.

Figure 2:
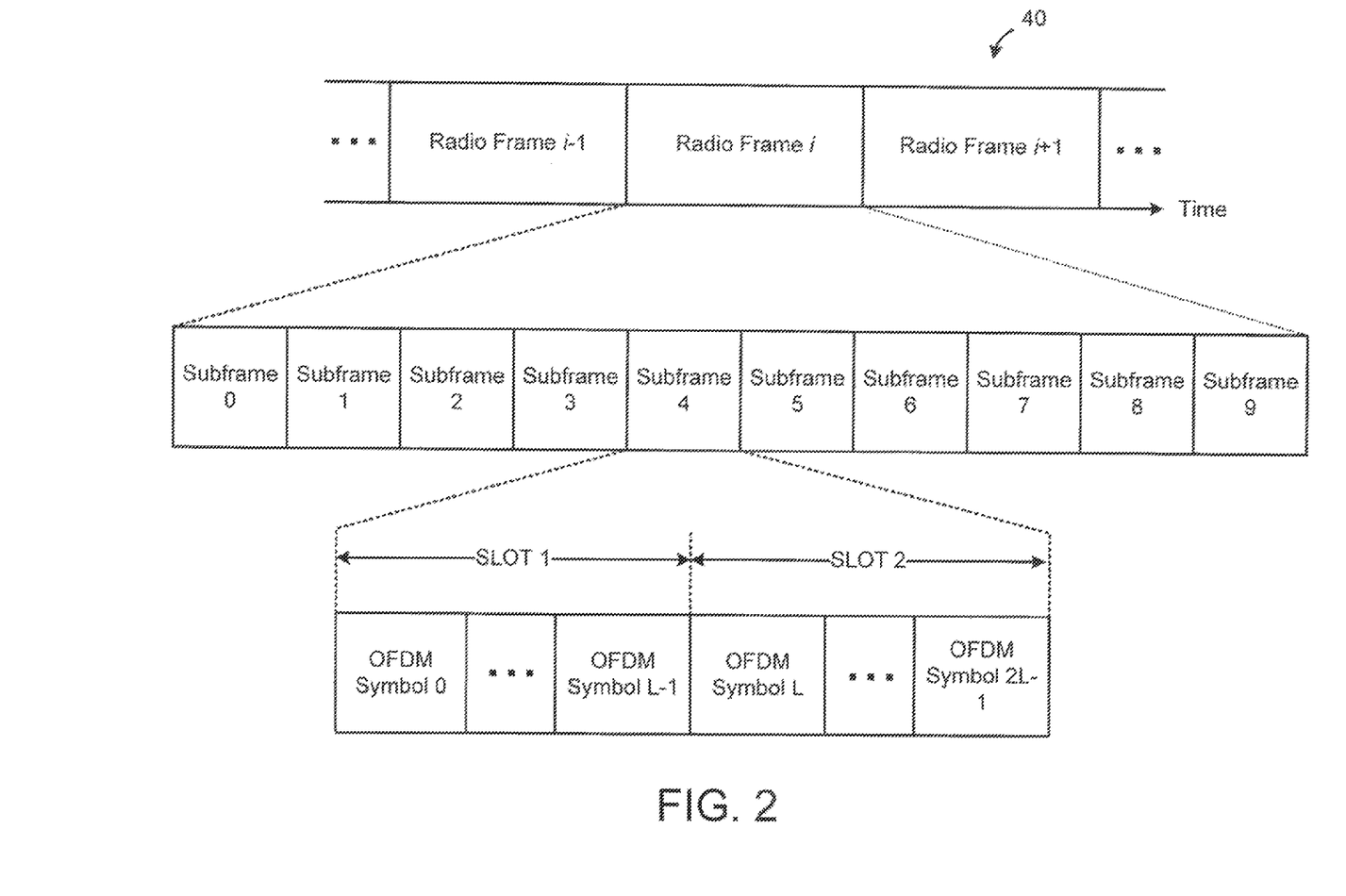
FIG. 2 shows an exemplary transmission frame structure that may be used on the downlinks in the network of FIG. 1.

FIG. 2 shows a transmission frame structure 40 that may be used on the downlinks in the network 50 disclosed herein. The transmission timeline is partitioned into units of radio frames. Each radio frame has a predefined duration (e.g., 10 milliseconds) and may be partitioned into 10 subframes, with indices of 0-9, as shown. Each subframe may include two slots, and each slot may include L symbol periods. In LTE, L may be equal to six for an extended cyclic prefix or seven for a normal cyclic prefix.

As mentioned earlier, LTE utilizes OFDM on the downlink and single-carrier SC-FDM on the uplink. OFDM and SC-FDM partition the system bandwidth into multiple (K) orthogonal subcarriers, which are also commonly referred to as tones or bins. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. On the downlink, each subframe may include 2L OFDM symbols in symbol periods 0 through 2L−1, as shown in FIG. 2.

LTE supports transmission of unicast information to specific UEs. LTE also supports transmission of broadcast information to all UEs and multicast information to a group of UEs using MBSFN transmission. A subframe used for sending unicast information is typically referred to as a regular subframe. A subframe used for sending multicast and/or broadcast information is typically referred to as an MBSFN subframe.

Figure 3:
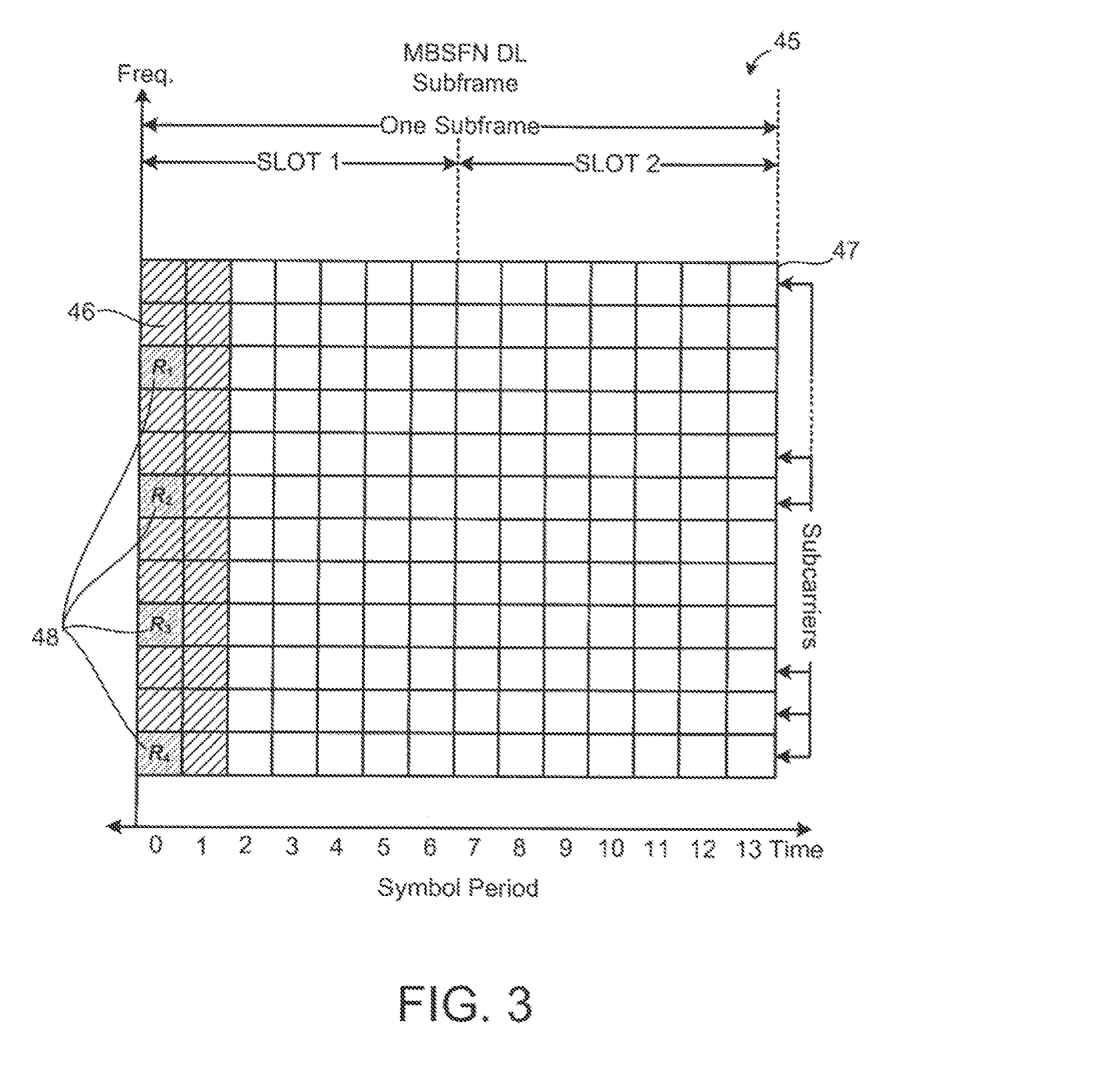
FIG. 3 depicts an exemplary resource-block structure for MBSFN subframes.

FIG. 3 depicts an exemplary resource-block structure 45 for MBSFN subframes. Each DL subframe is normally divided into a control region 46 consisting of the first few OFDM symbol periods, and a data region 47, consisting of the remaining part of the subframe. The control region is usually of length of one or two OFDM symbols, followed by the data region 47, as shown in FIG. 3. Information about the set of subframes that are configured and transmitted as MBSFN subframes is provided to eNBs as part of the network system information, which may be maintained and distributed by a network control entity included in the network (not shown).

The exemplary MBSFN subframe format 45 may be used by an eNB, such as the nodes 52, 54, 56 described herein. Cell-specific reference signals 48 may be sent in symbol period 0 and other symbol periods (not shown) on a predefined set of subcarriers. In the example shown, the PDCCH and other control signals may be sent in symbol periods 0 to 1 in the control region 46. Data transmission may be sent in the resource elements of the remaining symbol periods 2 to 13 of the data region 47.

Figure 4:
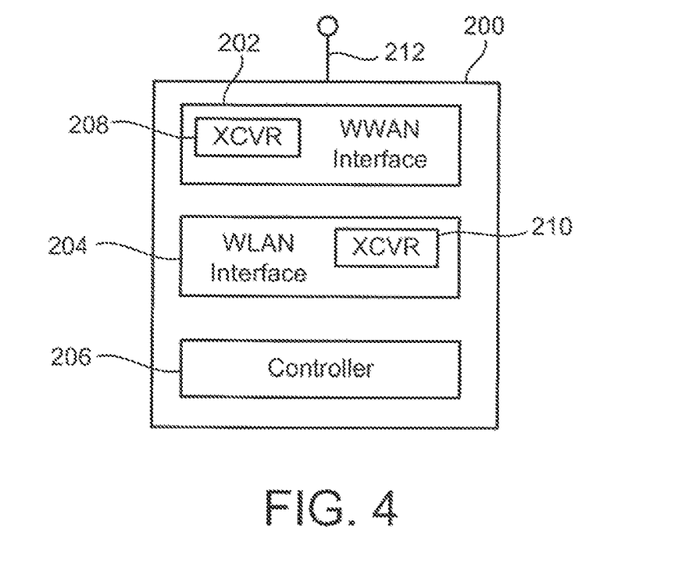
FIG. 4 is a block diagram illustrating certain components of exemplary user equipment (UE) usable in the network of FIG. 1.

FIG. 6 is a simplified block diagram illustrating certain components of an exemplary user equipment (UE) 200 usable in the network 50 of FIG. 1. The UE 200 can be any of the UEs 64, 66, 68. The UE 200 includes, among other things, one or more antennas 212 for permitting radio communications with the network nodes, a wireless wide-area network (WWAN) interface 202 having a transceiver (xcvr) 208. The WWAN interface 202 provides an air interface for communicating with network nodes (e.g., base stations), such as eNBs. The UE 200 also includes an air interface for communicating with nodes that use a different RAT, such as a Wi-Fi WAN interface 204 having a transceiver (xcvr) 210.

A controller 206 is also included in the UE 200. The controller 206 may include any suitable processor, processor arrangement, memory, logic circuitry, circuit, arrangement of electronics, programming code, data or combination thereof that performs the functions described herein as well as facilitating the overall operability of the UE 200. The controller 206 controls components of the UE to manage the functions of the UE 200. The controller 206 is connected to and/or includes a memory (not shown) which can be any suitable memory storage device capable of storing computer programming code and data. Machine-readable data and executable instructions (also referred to as applications, software, firmware, code or program) are stored in the memory and executed (or run) on the controller. All memory devices described herein may comprise any suitable combination of volatile (e.g., random access memory) or non-volatile (e.g., read-only memory) storage known in the art. The controller 206 may comprise one or more microprocessors, microcontrollers, DSPs, IP-cores, co-processors, similar devices or combinations thereof. Using known programming techniques, software stored in the memory may cause the controller 206 to operate the UE 200 to achieve the functionality described herein. Indeed, the controller 206 may be configured to perform the UE methods and functions disclosed herein.

Figure 5:
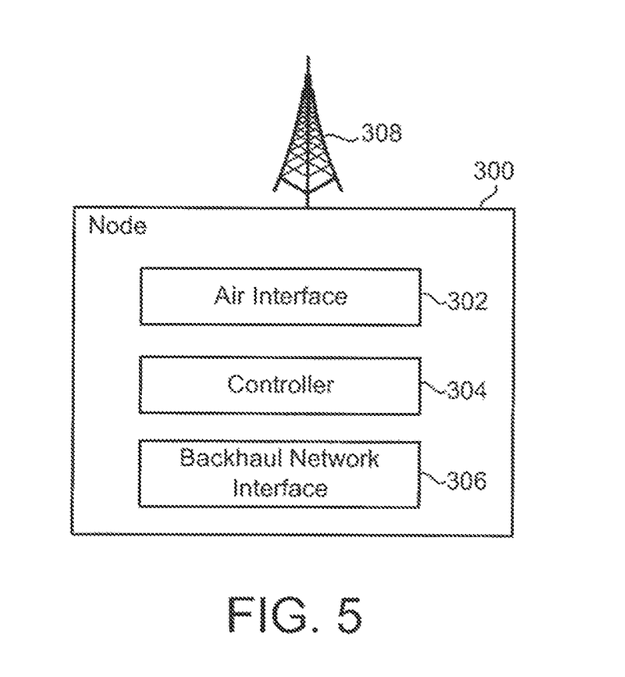
FIG. 5 is a block diagram illustrating certain components of an exemplary cell node usable in the network of FIG. 1.

FIG. 5 is a simplified block diagram illustrating certain components of an exemplary cell node 300 usable in the network 50 of FIG. 1. The cell node 300 may be any of the nodes 52, 54, 56. The cell node 300 may be an eBN, and includes, among other things, one or more antennas 308 configured to communicate with at least the UEs operating in the network, an air interface 302 for radio communication with the UEs and a backhaul network interface 306 for communicating with other devices and nodes in the network over a backhaul network.

A controller 304 is also included in the node 300. The controller 304 may include any suitable processor, processor arrangement, memory, logic circuitry, circuit, arrangement of electronics, programming code, data or combination thereof that performs the node functions described herein as well as facilitating the overall operability of the node 300. The controller 304 controls components of the node 300 to manage the functions of the node 300. The controller 304 is connected to and/or includes a memory (not shown) which can be any suitable memory storage device capable of storing computer programming code and data. Machine-readable data and executable instructions (also referred to as applications, software, firmware, code or program) are stored in the memory and executed (or run) on the controller. All memory devices described herein may comprise any suitable combination of volatile (e.g., random access memory) or non-volatile (e.g., read-only memory) storage known in the art. The controller 304 may comprise one or more microprocessors, microcontrollers, DSPs, IP-cores, co-processors, similar devices or combinations thereof. Using known programming techniques, software stored in the memory may cause the controller 304 to operate the node 300 to achieve the functionality described herein. The controller 304 may be configured to perform the node methods and functions disclosed herein.

Figure 6:
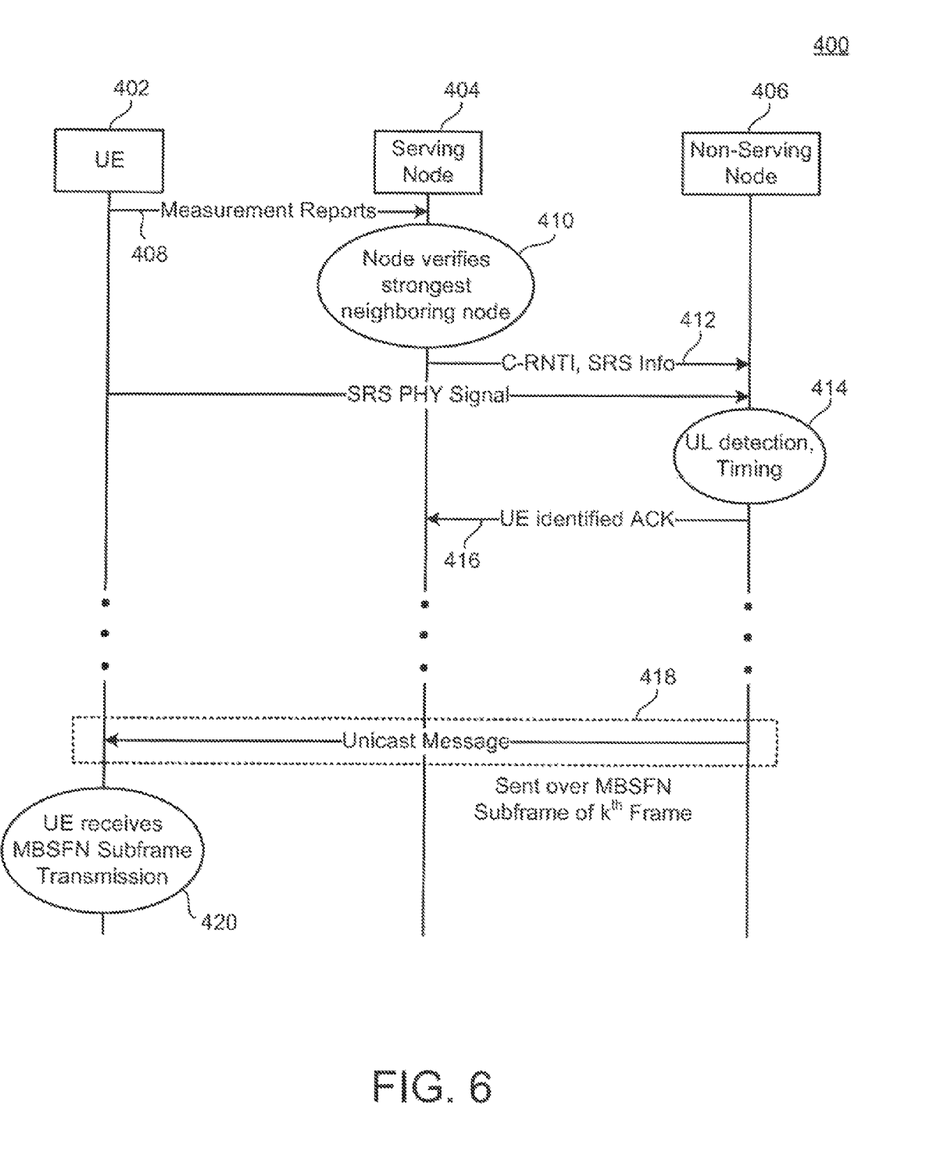
FIG. 6 is a signal flow diagram illustrating a procedure for transmitting inter-cell messages using one or more MBSFN subframes.

FIG. 6 is a signal flow diagram 400 illustrating a procedure for transmitting inter-cell unicast messages in one or more MBSFN subframes between a non-serving node 406 and a UE 402. Specifically, the diagram 400 shows LTE signal flows between the UE 402, a serving node 404 and the non-serving node 406. The UE 402 can be any of the UEs disclosed in this document. The serving node 404 is a cell node that is presently providing services to the UE 402, and may be an eNB. The non-serving node 406 is a cell node that is not presently providing services to the UE 402, and may be, for example, an adjacent node or home node in the cellular network. The non-serving node 406 may be an eNB.

The procedure of FIG. 6 can be used in the network 50 of FIG. 1.

FIG. 6 shows the signaling flow for unicast MBSFN Subframe transmission by the non-serving node 406, which can be a neighboring node. The non-serving node 406 may obtain the sounding reference signal (SRS), Cell Radio Network Temporary Identifier (C-RNTI) and/or related information of the UE 402 by polling the serving node 404, or the serving node 404 can share this information autonomously with its neighboring nodes. The neighboring, non-serving node 406 can then detect the UE 402 by detecting SRS or any other uplink (UL) physical level (PHY) signal transmitted by the UEs to its serving node 404 using the UE information provided by the serving node 404.

The process starts by the UE 402 sending one or more measurement reports 408 to the serving node 404. The measurement reports may include the reference symbol received power (RSRP) and the carrier received signal strength indicator (RSSI), i.e., the measured power levels of transmissions between the serving node 404 and the UE 402. The measurement reports may additionally/alliteratively include RSRP and RSSI measured between the non-serving node 406 and the UE 24.

In response to the measurement reports 408, the serving node 404 identifies the strongest neighboring nodes corresponding to the UE when, for example, the node 404 determines that the UE 402 is nearing an edge of the serving node's coverage area (cell). The information identifying the strongest neighbor may be programmed into the serving node 404 so that it is known to the node 404 a priori, it may be received by the node 404 over the backhaul network from the network control entity as part of the network system information, for example, or it may be determined from neighboring node RF signals measured by the node 404.

If the serving node 404 determines that the UE 402 should receive unicast information in MBSFN subframes from the neighboring node 406, the serving node 404 transfers C-RNTI and SRS information 412 about the UE 402 to the non-serving node 406. The information 412 is sufficient to permit the non-serving node 406 to monitor the PHY signals from the UE 402.

After receiving the information 412, the non-serving node 406 begins monitoring SRS PHY signals emitted from the UE 402, based on the information 412 it received. Based on the monitored signals, the non-serving node 406 detects the uplink (UL) channel being used by the UE 402 and the UL timing (step 414). After successfully identifying the UE 402, the non-serving node 406 sends a UE-identified acknowledgement (ACK) 416 to the serving node 404. Subsequent to the UE-ID ACK 416, the non-serving node 406 commences transmission of unicast messages 418 to the UE 402, which can be sent, for example, over an MBSFN subframe of the k frame. Although the non-serving node 406 does not directly control the UE's mobility and security operations it is allowed to send both relevant signaling information (e.g., handover parameters related to the non-serving node 406 or the target cell) and any unicast data to the UE 402 with or without incorporation or permission from the serving node 404. Sending of the unicast message 418 may, in some circumstances, be restricted to only during a handover. The unicast messages are included in the data region of the MBSFN subframe. Interference with other nodes transmitting in the MBSFN subframes may avoided by using the techniques described below, including those referencing FIGS. 7 and 8.

In step 420, the UE 402 receives the MBSFN subframe transmission. The MBSFN subframe may include cell-specific information about the non-serving node 406 that permits the UE 402 to more efficiently execute a handover from the serving node 404 to the non-serving node 406, or perform a search, such as an intra-frequency, inter-frequency, inter-RAT search and measurement, or the like. In some cases, the non-serving node 406 may provide the configuration of the Almost Blank Subframes (ABS) for RSRP or RSRQ (reference signal received quality) measurements under reduced interference from neighboring aggressor cell.

Figure 7:
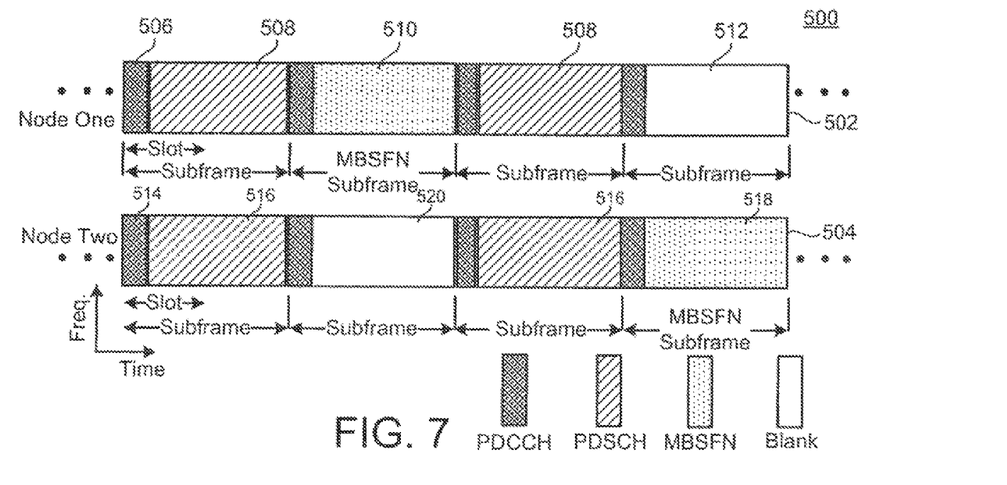
FIG. 7 is a conceptual diagram illustrating a first method of unicasting/multicasting node-specific information in MBSFN subframes so as to reduce or avoid interference with other nodes transmitting MBSFN subframes.

FIG. 7 is a conceptual diagram 500 illustrating a first method of unicasting/multicasting node-specific MBSFN subframes so as to reduce or avoid interference with other nodes transmitting MBSFN subframes. This method may be used in connection with the procedure depicted in FIG. 6 and/or the operation of the network 50 of FIG. 1.

If neighboring cell nodes use the same set of resources to unicast/multicast their own data in MBSFN subframes at the same time, then they may cause interference to each other. In order to avoid interference, orthogonal sets of resources can be assigned to each cell (node). The resources may be the data region resource elements of the MBSFN subframes, as depicted in FIG. 3.

FIG. 7 shows a frequency vs. time chart that depicts an example DL frame transmission period of two neighboring nodes, Node One and Node Two, which generally transmit on the different frequency channels, with the exception of the MBSFN subframes. Node One transmits a first frame 502 during the period. The first frame 502 includes PDCCH headers 506, PDSCH subframe data region 508, MBSFN subframe data region 510, and a blank subframe data region 512. A PDCCH 506 is included in each subframe. Node Two transmits a second frame 504 during the period. The second frame 504 includes PDCCH headers 514. PDSCH subframe data region 516, MBSFN subframe data region 518, and a blank subframe data region 520. A PDCCH 514 is included in each subframe. Although only two nodes are depicted in FIG. 7, this technique can be applied to any suitable number of nodes.

The method depicted in FIG. 7 provides that the two MBSFN subframes 510, 518 within one frame duration can be assigned as MBSFN subframes, without any overlap. The assignment of these subframes can be made by the network control entity and the nodes have a priori knowledge of the subframe assignments. To avoid interference, Node One transmits data during the first MBSFN subframe 510, while the Node Two "blanks" during the first MBSFN subframe data region. Blanking means that the node does not transmit during the period defined for the MBSFN subframe data region 510 of the first frame 502. Thus, FIG. 7 shows that Node One transmits unicast/multicast data in the first MBSFN subframe data region 510 and during the same MBSFN subframe period 510. Node Two does not transmit 520.

For the second MBSFN subframe 518, the roles of the nodes are reversed, whereby Node Two unicasts/multicasts data during the MBSFN subframe data region 518 and Node One blanks 512 during the second MBSFN subframe data region 518.

During MBSFN subframe transmissions, each node is also allowed to increase transmit power (if needed) so that their downlink (DL) can reach further into the other node's coverage area. This allows neighbor nodes to serve UEs which are at the cell boundary, but still within coverage of the serving node. None of the MBSFN transmissions from different cells interfere with one another only since only one cell is transmitting data during any MBSFN subframe data region. This allows a node to unicast/multicast dedicated UE signaling or cell-specific messages using the MBSFN subframe.

Figure 8:
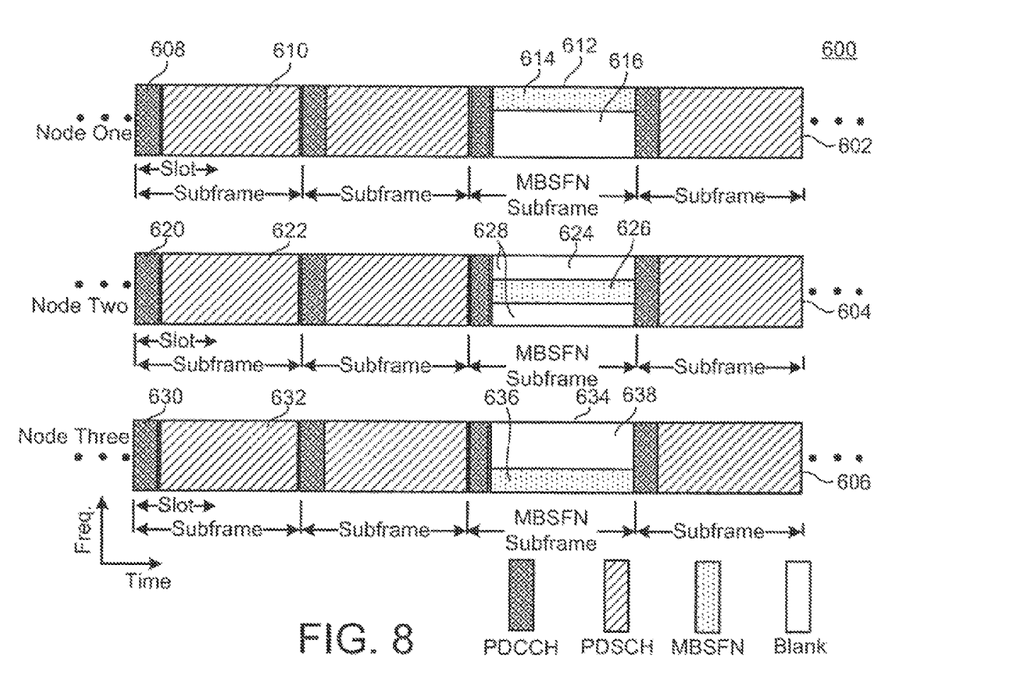
FIG. 8 is a conceptual diagram illustrating a second method of unicasting/multicasting node-specific information in MBSFN subframes so as to reduce or avoid interference with other nodes transmitting MBSFN subframes.

FIG. 8 is a conceptual diagram 600 illustrating a second method of unicasting/multicasting node-specific MBSFN subframes so as to reduce or avoid interference with other nodes transmitting MBSFN subframes. In contrast to the method of FIG. 7, the second method of FIG. 8 involves splitting each MBSFN subframe into three sets of carrier sub-bands, with each carrier sub-band to being assigned to one of the three nodes. This method may be used in connection with the network 50 of FIG. 1. Although only three nodes are depicted in FIG. 8, this technique can be applied to any suitable number of nodes.

FIG. 8 shows a frequency vs. time chart that depicts an exemplary DL frame transmission period of three neighboring nodes, Nodes One, Two and Three, that transmit on the different frequency bands, with the exception of MBSFN subframes. Node One transmits a first frame 602 during the period. The first frame 602 includes PDCCH headers 608, PDSCH subframe data regions 610, and an MBSFN subframe data region 612. Node Two transmits a second frame 604 during the period. The second frame 602 includes PDCCH headers 620, PDSCH subframe data regions 622, and an MBSFN subframe data region 624. Node Three transmits a third frame 606 during the period. The third frame 606 includes PDCCH headers 630, PDSCH subframe data regions 632, and an MBSFN subframe data region 634. The PDSCH and MBSFN subframes in each frame 602, 604, 606 each include a PDCCH header.

The MBSFN subframe data period is frequency divided into three carrier sub-bands 614, 626, 636. In the example shown, the first carrier sub-band 612 is assigned to Node One, the second carrier sub-band 626 is assigned to the Node Two and the third carrier sub-band 636 is assigned to the Node Three. If a carrier sub-band is not assigned to a node, then that node blanks the carrier sub-band in order to prevent interference with other nodes. For example, Node One transmits its MBSFN subframe data on the first carrier sub-band 614 and simultaneously blanks 616 the other two carrier sub-bands. Likewise, Node Two transmits its MBSFN subframe data on the second carrier sub-band 626 and simultaneously blanks 628 the other two carrier sub-bands, while Node Three transmits its MBSFN subframe data on the third carrier sub-band 636 and simultaneously blanks 638 the other two carrier sub-bands.

The frequency division of MBSFN subframes can be accomplished by assigning predefined sets of one or more OFDM subcarriers to each node in the MBSFN subframe data region to form the carrier sub-bands. The OFDM subcarriers in each set may be adjacent subcarrier bands. The OFDM subcarrier node assignment can be predefined by a network control entity or any other suitable means, and knowledge of the assignments can be distributed to the nodes over the network. The carrier sub-band assignments may be static or dynamic.

The following are other methods that can be deployed in the network 50 to avoid interference between neighboring nodes during MBSFN subframe unicast/multicast transmissions.

Time-domain solution: a single MBSFN subframe data region is split into time slots. For example, the MBSFN subframe data period may be split into three adjacent time slots: the first time slot is assigned to a first node, and the other two nodes blank the first time slot. The second and third time slots are similarly assigned to the second node and the third node, respectively. A node blanks the MBSFN data region during the time slots in which it is not unicasting/multicasting data. This method has the advantage that the number of blanked subframes is reduced since only one-third of an MBSFN subframe data period is allocated to each node.

The time division of MBSFN subframes can be accomplished by assigning predefined sets of one or more OFDM symbol periods in the MBSFN subframe to each node to form the carrier sub-bands. The OFDM symbol period assignments can be predefined by a network control entity or any other suitable means, and knowledge of the assignments can be distributed to the nodes over the network. The OFDM symbol period assignments may be static or dynamic.

Code-domain solution: Each node spreads its data transmission during the MBSFN subframe data region with a unique code. This requires the data to be multiplied by a spreading code (i.e., a higher chip rate). This may require more bandwidth depending on the spreading rate. This method has the advantage that no subframes need to be blanked and all neighbor nodes can unicast/multicast MBSFN subframe data simultaneously with little node-to-node interference. With this solution, the UEs de-spread the data by using an assigned spreading code in order to recover the data. The spreading codes can be determined, assigned and managed by the network elements, such as a network control entity and/or the nodes, using known techniques.

The above time-domain and code-domain schemes can be set up statically or dynamically. In addition, the foregoing methods of unicasting/multicasting node-specific content in MBSFN subframes can be combined together where appropriate to, for example, increase the number of nodes that can simultaneously transmit unique data in the MBSFN subframes.

Other embodiments and modifications of this invention will occur readily to those of ordinary skill in the art in view of these teachings. Thus, the above description is illustrative and not restrictive. This invention is to be limited only by the following claims, which include all such embodiments and modifications when viewed in conjunction with the above specification and accompanying drawings. The scope of the invention should, therefore, be determined with reference to the appended claims along with their full scope of equivalents.

What is claimed is:
1. A cellular communication system, comprising:
a plurality of nodes communicatively coupled via a backhaul network, where a first node of the plurality of nodes is configured to transmit information to a user equipment (UE) being served by a second node, the information being transmitted in a Multicast Broadcast Single Frequency Network (MBSFN) subframe or portion thereof reserved only for data transmitted by the first node, wherein the first node is assigned a first spreading code and the second node is assigned a second spreading code different from the first spreading code, and the first node is configured to spread first information using the first spreading code, whereby producing spread first information, and to transmit the spread first information in the MBSFN subframe, and the second node is configured to spread second information using the second spreading code, whereby producing second spread information, and to transmit the spread second information in the MBSFN subframe.

2. The cellular communication system of claim 1, further comprising:
the second node configured to select the first node based upon predetermined criteria and transfer UE-specific signaling information to the first node as a result of the first node being selected.

3. The cellular communication system of claim 2, wherein the predetermined criteria include one or more measurement reports from the UE.

4. A method of transmitting information in a cellular communication system, comprising:
transmitting information from a first node to a user equipment (UE) being served by a second node, the information being transmitted in a Multicast Broadcast Single Frequency Network (MBSFN) subframe or portion thereof reserved only for data transmitted by the first node, wherein the first node is assigned a first spreading code and the second node is assigned a second spreading code different from the first spreading code, and the first node is configured to spread first information using the first spreading code, whereby producing spread first information, and to transmit the spread first information in the MBSFN subframe, and the second node is configured to spread second information using the second spreading code, whereby producing second spread information, and to transmit the spread second information in the MBSFN subframe.

5. The method of claim 4, further comprising:
providing services to the UE from the second node;
selecting the first node based upon predetermined criteria; and
transferring UE-specific signaling information from the second node to the first node as a result of the first node being selected.

6. The method of claim 5, wherein the predetermined criteria include one or more measurement reports from the UE.

* * * * *